United States Patent [19]

Vanessi

[11] Patent Number: 4,815,720

[45] Date of Patent: Mar. 28, 1989

[54] DAMPING DEVICE WITH ELASTOMERIC DIAPHRAGM FORMING CONDUIT WALL

[75] Inventor: Giovanni Vanessi, Milan, Italy

[73] Assignee: Pirelli Accessori Industriali S.p.A., Italy

[21] Appl. No.: 114,249

[22] Filed: Oct. 29, 1987

[30] Foreign Application Priority Data

Oct. 31, 1986 [IT] Italy .................. 22193 A/86

[51] Int. Cl.$^4$ .................. F16M 1/00; F16F 7/00; F16F 9/08

[52] U.S. Cl. ...................... 267/140.1; 248/562; 248/636; 267/122; 267/219; 188/320

[58] Field of Search .......... 267/140.1, 219, 220, 267/217, 64.13, 122, 140.3, 140.4, 141.1, 152, 153; 188/322.5, 269, 378, 320; 248/636, 562, 631

[56] References Cited

U.S. PATENT DOCUMENTS

| | | | |
|---|---|---|---|
| 4,469,316 | 9/1984 | Van Den Boom et al. | 248/562 |
| 4,568,069 | 2/1986 | Poupard | 248/562 X |
| 4,621,795 | 11/1986 | Eberhard et al. | 248/636 X |
| 4,641,808 | 2/1987 | Flower | 248/562 X |
| 4,645,189 | 2/1987 | Quast | 267/140.1 |
| 4,647,023 | 3/1987 | Ray et al. | 267/219 |
| 4,651,978 | 3/1987 | Grafström | 267/140.1 X |
| 4,666,137 | 5/1987 | Hamaekers et al. | 267/140.1 |
| 4,697,794 | 10/1987 | Brenner et al. | 267/140.1 X |
| 4,709,907 | 12/1987 | Thorn | 248/562 X |
| 4,711,206 | 12/1987 | Andräet al. | 248/636 X |

FOREIGN PATENT DOCUMENTS

| | | | |
|---|---|---|---|
| 0187188 | 7/1986 | European Pat. Off. | 267/140.1 |
| 0231898 | 8/1987 | European Pat. Off. | 267/140.1 |
| 0052439 | 3/1986 | Japan | 267/140.1 |
| 0144442 | 7/1986 | Japan | 267/140.1 |

Primary Examiner—Douglas C. Butler
Attorney, Agent, or Firm—Stevens, Davis, Miller & Mosher

[57] ABSTRACT

A damping device which is disposed between an oscillating mass and a fixed structure. The device includes a rigid container, a first membrane forming the lid of the container, a low-viscosity liquid inside the container, an elastomeric diaphragm separating the space inside the container into two chambers, a second elastomeric membrane forming the base of the second chamber, and annular conduit with its two ends hydraulically connecting the first chamber to the second chamber for damping low frequency and high amplitude oscillations of the oscillating mass. The elastomeric diaphragm extends up to the annular damping conduit, and the diaphragm forms at least a portion of the conduit wall.

9 Claims, 3 Drawing Sheets

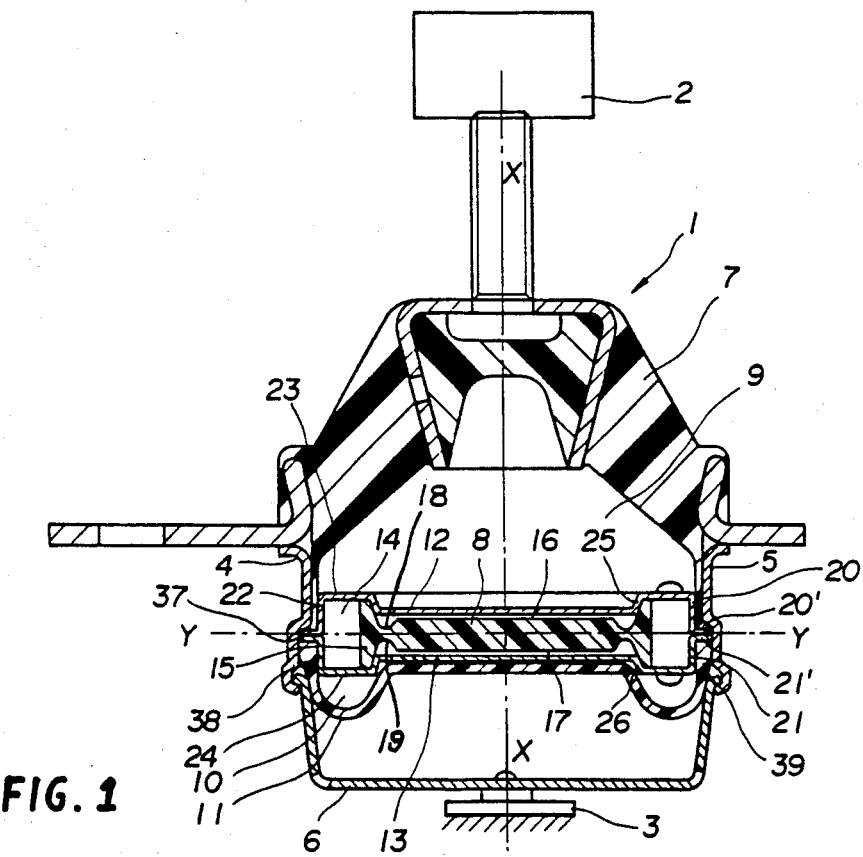
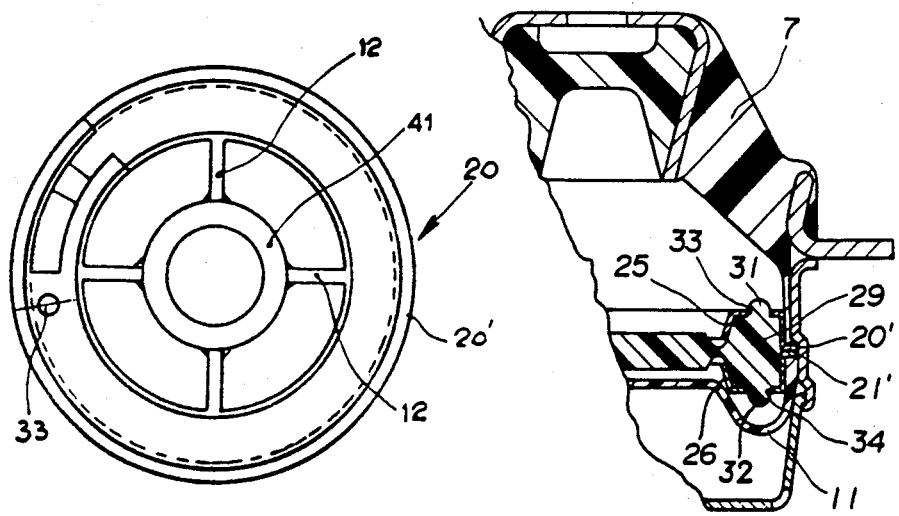
FIG. 1
FIG. 10
FIG. 2

DAMPING DEVICE WITH ELASTOMERIC DIAPHRAGM FORMING CONDUIT WALL

FIELD OF THE INVENTION

The present invention relates to a hydraulic damping device that is disposed between an oscillating mass and a fixed structure relative to the oscillating mass, and more particularly, the invention refers to a hydraulic damping device, wherein a low-viscosity liquid is made to pass, through forcing means, through a conduit for damping the low-frequency and high amplitude vibrations to which the oscillating mass is subjected.

BACKGROUND OF THE INVENTION

Usually damping devices of the type cited above can find use in various industrial aplications, for example, they are disposed between an oscillating mass constituted by the engine of motor-vehicle and the body-chassis of the vehicle itself.

Generally speaking, according to some solutions, hydraulic damping devices can comprise a rigid container, an elastomeric membrane that forms the lid of the container, an elastomeric diaphragm which separates the space inside the container into two chambers, i.e., respectively upper and lower chambers, and a second membrane forming the base of the second chamber, with a low-viscosity liquid being disposed in both these two chambers.

The upper and lower chambers are hydraulically connected to one another by an annular conduit which extends over a predetermined arc, that is provided with two extremities, one present in the upper chamber and the other in the lower chamber.

In a device of this type, when the mass oscillates with a low-frequency and small a amplitude, for example, with a frequency between 100 and 200 Hz. and an amplitude between 0.1 and 0.2 mm, practically speaking, no shifting of the liquid occurs, between the first and second chambers, because due to the speed with which the oscillations take place, this liquid is unable to traverse the annular conduit which is selected to have apt dimensions.

The pressure variations and volume variations in the liquid are absorbed by the elastomeric deformation of the membrane that forms the lid and by the shifting of the diaphragm between two extreme positions.

When the mass oscillates, with a low-frequency and a great amplitude, for example, with frequency values between 5 and 30 Hz., and amplitudes between 1 and 5 mm, it so happens that the diaphragm is brought up against the opposite fixed surfaces joined to the container walls and the liquid is forced to pass through the annular conduit with the result that energy is dissipated due to viscous damping. In practice, in the cited devices, the geometrical dimensions of the annular conduit, e.g., the length and value of the transverse section, are chosen so as to allow the passage of the liquid between the first and the second chamber, then vice-versa, at a predetermined value of low-frequency and great amplitude, with a corresponding damping of the relative oscillation.

The known device, generally comprise an annular conduit which is constructed by approaching two rigid parts together.

Moreover, the two rigid parts, which are spaced apart from the conduit, form special pressing means for the outermost annular edge of the elastomeric diaphragm.

In these types of devices, due to the high pressure with which the liquid is forced into the annular conduit, it could happen that liquid is drawn through the contacting surfaces of the two halves of the conduit itself.

As can be readily appreciated, any such drawing of liquid is not acceptable, since it causes the viscous damping to be irregular at the predetermined frequencies.

Moreover, in the cited devices, the additional pressure of the liquid tends to draw apart the two rigid halves forming the conduit, and hence, to diminish the pressure of the pressing means upon the diaphragm.

Therefore, the known devices possess the drawbacks of (1) no reliable fluid-tight sealing of the annular conduit and (2) no satisfactory locking action at the edges of the elastomeric diaphragm.

Moreover, even if these cited drawbacks could be overcome with a simple construction that will prove to be reliable with the passing of time, it has also been verified that the known devices present an excessive rigidity when faced with high-frequencies, i.e., the known devices tend to transmit, with values substantially unaltered or in any event with high values, the oscillations of high frequency and small amplitude, to the vehicle body, and hence also to passengers inside the vehicle.

SUMMARY OF THE INVENTION

The object of the present invention is to provide a hydraulic damping device which overcomes all of the above-noted drawbacks in the prior art.

The present invention provides a hydraulic damping device disposed between a mass capable of oscillating in the direction of the damping device axis and a structure that is fixed relative to the oscillating mass. The damping device comprises a rigid container delimited by a lateral wall and by a base, a first elastomeric membrane forming the container-lid, an elastomeric diaphragm defined by a central plane substantially perpendicular to the direction of the oscillations, said diaphragm dividing the space inside the container into two chambers, respectively the upper and the lower chambers, a second elastomeric membrane being connected in a fluid-tight manner to the lateral wall of the container, said second membrane forming the base of said lower chamber, two stop-limit elements, disposed at a distance apart from the two opposite surfaces of the diaphragm, a low viscosity liquid introduced into the said two chambers, an annular conduit provided with two extremities hydraulically connected to the first and second chambers respectively, for damping low frequency and high amplitude oscillations of the oscillating mass, said damping device being characterized in that the elastomeric diaphragm extends up to the annular damping conduit and forms at least one portion of the wall of said conduit.

BRIEF DESCRIPTION OF THE DRAWINGS

The present invention will be more fully understood from the detailed description set forth below when considered in conjunction with the following figures, wherein:

FIG. 1 shows the device of the invention, in an axial plane.

FIG. 2 shows a cross-sectional view of a detail of the device of FIG. 1.

FIG. 10 shows a preferred form of embodiment of the ridge elements, which provides the limits within which the diaphragm can oscillate.

DETAILED DESCRIPTION OF THE INVENTION

Figure 3:
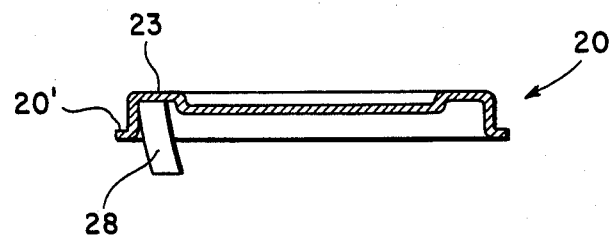
FIG. 3 shows one of the two rigid-halves of the device according to the invention, for forming the hydraulic damping conduit.

By way of non-limiting example, FIG. 1 illustrates a hydraulic damping device 1, that is disposed at the two extremities, between an oscillating mass 2, for example, an engine of a motor-vehicle and a structure 3 fixed relative to oscillating mass 2, in the example of the car chassis.

Support 1 comprises a rigid container 4 with lateral wall 5 and with a frusto-conical shape, forming the container-lid, an elastomeric diaphragm 8, separating the space within container 4 into two chambers, respectively upper chamber 9 between the lid 7 and diaphragm 8 and lower chamber 10 between diaphragm 8 and container 4.

The device has a central longitudinal axis X—X in the direction of the forces applied by the oscillating mass, and diaphragm 8 is defined by a central plane Y—Y substantially perpendicular to the axis X—X.

Lower chamber 10 is closed by a second elastomeric membrane 11 sealingly connected to lateral wall 5 of container 4 and it is subjected to expansion, in the presence of pressure variations in the liquid.

Second elastomeric membrane 11 can have a thickness within the range of values from 1 to 3 mm.

Diaphragm 8 can oscillate between two stop-limit elements 12, 13 which are made solid with the lateral walls of container 4.

The oscillations of diaphragm 8 occur when the low-viscosity liquid, disposed in the two chambers 9, 10 of the support, is subjected to pressure variations caused by the high frequency and small amplitude oscillations of mass 2.

The two chambers 9, 10 are connected hydraulically by an annular conduit 14 disposed along the central plane Y—Y.

Annular conduit 14 can extend over an arc of a circle that is comprised, according to some examples, between 250 and 300 degrees.

Conduit 14 damps the low frequency and high amplitude oscillations transmitted by mass 2 to the low viscosity liquid, which liquid being composed, for example, of a mixture of water and glycol.

The fundamental characteristic of the invention lies in the fact that the same element that proves useful for filtering the high frequency and small amplitude vibrations between engine and chassis, i.e., diaphragm 8, also forms an intergral part of the element that proves useful for damping the low frequency and small amplitude vibrations, i.e., part of annular conduit 14.

In fact, as is clear from FIG. 1, diaphragm 8 extends up to annular damping conduit 14 and forms at least a portion of the conduit-wall.

Preferably, elastomeric diaphragm 8 forms portion 15 of the conduit wall that is disposed at the radially innermost position in container 14.

More precisely, diaphragm 8 comprises a first part, of a constant thickness, delimited by two opposite surfaces 16, 17 parallel to each other, and a second part 15 that, in the cross-section shown in FIG. 1, is perpendicular to the first part and which forms, as stated above, the radially innermost wall of the conduit 14.

Figure 6:
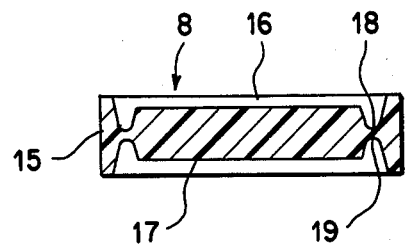
FIGS. 6 and 7 show two transverse sections, of the elastomeric diaphragm of the damping device of the invention.
Figure 7:
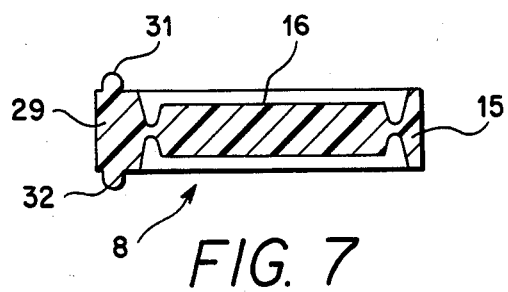

Between the central part of diaphragm 8 and its peripheral part, there are two hinge-zones provided by two annular opposite grooves 18, 19 having U-shaped cross-section (see FIGS. 1, 6 and 7).

The form of the grooves 18, 19 is such as to be filled with the minimum quantity of liquid so as to originate a small column of liquid interposed between diaphragm 8 and stop-limit elements 12, 13.

In the preferred example of FIG. 1, diaphragm 8 is fixed to a rigid metallic structure having two halves 20, 21 which are joined together to define annular conduit 14. These two-halves 20, 21 are approached together, along two outer flanges 20', 21' as seen in FIG. 2.

Conduit 14 has a transverse section of a rectangular form comprising an outer side 22, bases 23, 24 and two prolongations 25, 26 cut away at the center to be disposed on a peripheral part 15 of diaphragm 8.

From bases 23, 24 there issue forth stop-limit elements 12, 13 in the form of radial spokes.

As is seen in FIG. 1, the elastomeric part of conduit 14 abuts against rigid parts 25, 26 of the conduit itself.

Figure 5:
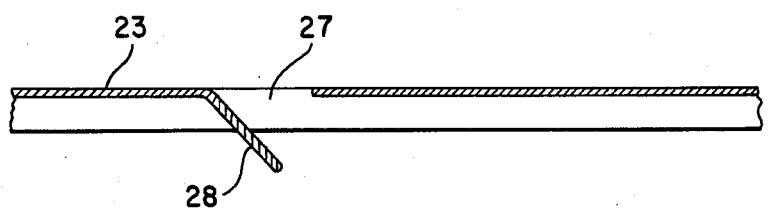
FIG. 5 shows the configuration of the rigid conduit, along the line 1—1 of FIG. 3.

The rigid two halves 20, 22 that originate the rigid part of conduit 14 are identical and hence, for simplicity sake, herebelow there will only be described part 20 illustrated in FIGS. 3 and 5.

The upper rigid half 20 comprises an opening 27 intended for placing upper chamber into communication with the conduit 14.

Aperture 28 is followed by an inclined plane 28 directed from base 23 (FIG. 5) toward the opposite base 24 in the rectangular section of conduit 14.

Rigid half 21 is formed analogously and is provided with an aperture for connecting conduit 14 to second chamber 10 and, in its turn, the aperture will be followed by an inclined plane directed from base 24 to base 23 of rigid half 20.

Figure 8:
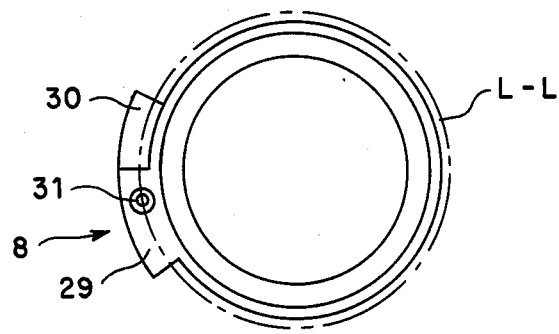
FIG. 8 shows a top-view of the diaphragm of FIGS. 6 and 7.

The space between the two inclined planes of the two rigid halves 20, 21 is filled (FIG. 8) with a corresponding portion 29 of elastomeric material, forming the radially outermost part of diaphragm 8.

Hence, diaphragm 8 will comprise two inclined planes one of which (see top-view of FIG. 8) is indicated with reference numeral 30.

Portion 29, with its relative upper and lower inclined planes forms an anchoring element between diaphragm 8 and conduit 14.

Moreover and preferably, the device comprises further means, for blocking relative to each other, diaphragm 8 and annular conduit 14.

Figure 4:
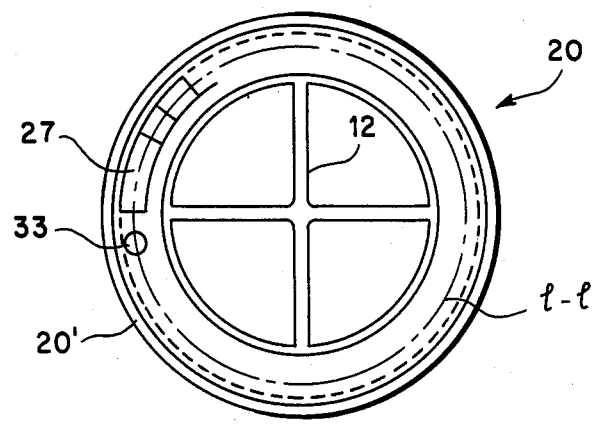
FIG. 4 shows a top-view of a detail of FIG. 3.
Figure 9:
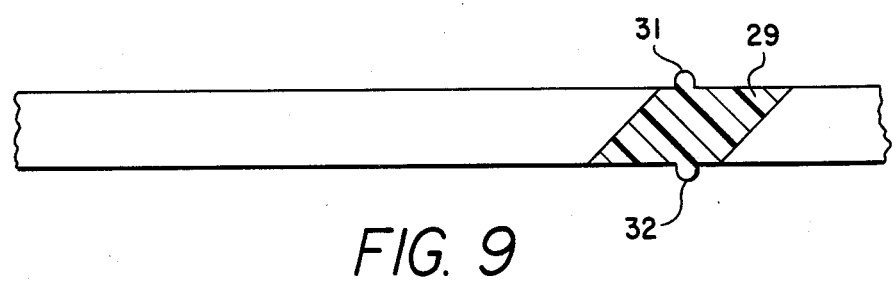
FIG. 9 shows the configuration of the diaphragm, taken along the line L—L of FIG. 8.

In one embodiment (FIGS. 6, 9), the blocking means comprises two protuberances 31, 32 made on portion 29 of diaphragm 8—in opposite position to each other, and with corresponding housing-seats (FIGS. 2 and 4) for the protuberances in the form of holes 33, 34, made on the opposite bases of annular conduit 14.

The connections between conduit 14 and diaphragm 8 and the lateral wall of container 4 are as follows:

The above-described structure (formed of conduit 14 and diaphragm 8) is connected (FIGS. 1 and 3) to container 4 by means of the two outer flanges 20', 21' of the two rigid halves 20 and 21.

The two flanges 20', 21' have one side resting against an annular seat 37 of the inner wall of container 4, and an annular edge of the first membrane 7 and the other side resting against the edge of a heel 38 which forms part of second membrane 11.

Next, heel 38 of second membrane 11 is pressed from the inner ridge surface 39 of container 4 which, in its turn, is grasped or held by another part of container 4 itself as is clearly seen in FIG. 1.

Apart from the embodiment described above, the device can also comprise other embodiments. As an alternative, for example, to the above-described structure, the stop-limit elements 12, 13 between which the elastomeric diaphragm 8 is allowed to oscillate, could be constructed with spokes—the extension of which is limited up to an annular crown 41, which leaves an empty space in its center.

This solution presents advantages since it obviates any localization of excessively high pressures, in that point where the deflection of elastomeric diaphragm 8 is more accentuated. Moreover, it prevents any formation of a column of water between elastomeric diaphragm 8 and the rigid parts, that would tend to oppose free oscillation of the diaphragm 8.

In operation, in the presence of high frequency vibrations of oscillating mass 2 of between 100 and 200 Hz. having an amplitude of between 0.1 and 0.2 mm which the outer system transmits to the liquid in the container, elastomeric diaphragm 8 deforms by oscillating between the two stop-limit portions determined by the upper and lower spokes 12, 13 fixed with the lateral wall of the container.

The transmission of high frequency vibrations from the liquid to the car-body, and hence, to passengers inside the car, is quite modest since the low rigidity of diaphragm 8 translates into elastic reactions that are of a low value when compared to the forces transmitted.

Still according to the above-cited high frequency conditions, the passage of the liquid between the two chambes 9, 10 is not permitted since conduit 14, chosen to have suitable dimensions, offers a high resistance to any passage of liquid.

The geometrical characteristics of the diaphragm for filtering out high frequencies can be within the following range of values:

(1) thickness at the center: between 6 and 12 mm; and
(2) thickness at throat 18, 19: between 0.5 and 2 mm.

In the presence of low-frequency vibrations of mass 2 between 5 and 30 Hz, with an amplitude of over 1 mm, for example, vibrations due to unevenness in the road, elastomeric diaphragm 8 is brought against the upper or lower spoke and the liquid, in having to bear the strong compression, is made to pass by force, from one chamber into the other, through annular conduit 14, thus dissipating energy and is this way damping the vibrations that are transmitted to the system.

The geometrical dimensions of annular conduit 14 suitable for determining the passage of the liquid, in the above-described conditions, are determined, in one embodiment by an area value of 60 mm$^2$ and by a length equal to 120 mm.

The invention achieves all its pre-established objectives. In fact, the presence of a wall 15 in annular conduit 14 made out of an elastomeric material guarantees a certain fluidsealing, through the passage of time, and along with this, also the reliability of the device for damping of vibrations of low frequency and great amplitude.

In particular, in the instance of vibrations of low frequency and great amplitude, it is verified that the overpressure of the liquid tends to expand wall 15 with the result that said wall-contact against the rigid prolongations of the conduit 14 is increased, thus obviating in this way all possible drawing of the liquid from the conduit toward the outside.

Moreover, by providing for a portion of conduit 14 to be formed from an elastomeric material, this eliminates through the elastic expansion of wall 15, any forces which tend to draw apart the two rigid halves 20, 21 of the conduit itself.

Therefore, as can be noted, elastomeric diaphragm 8, suited for filtering high frequency vibrations, also forms in the present device, a fundamental element for the purpose of the correct functioning of the damping conduit 14 for low frequency vibrations.

In other words, in the prior art, the diaphragm was capable only of filtering high frequency vibrations, whereas according to the invention, diaphragm 8 assumes a function that renders it suited also for damping low frequency vibrations.

In fact, the damping of the low frequency vibrations takes place mainly through the forced passage of the liquid into conduit 14 and partly, even if to a lesser extent, through the expansion of elastomeric wall 15, contrasted elastically by the innermost annular tract of elastomeric material which forms the base of grooves 18, 19.

A further fundamental characteristic of the invention is that diaphragm 8 is constructed so as to improve the filtering of high frequency vibrations, i.e., the transmissibility at high frequency.

In fact, in the present device, diaphragm 8 extends such that it forms a wall of conduit 14.

Therefore, in the present device, through the extension of the surface of diaphragm 8, the rigidity of the diaphragm is diminished in the presence of high frequency vibrations, i.e., the values of the elastic reactions transmitted to the vehicle are reduced, thus allowing improved riding comfort for automobile passengers.

The above description and the accompanying drawings are merely illustrative of the application of the principles of the present invention and are not limiting. Numerous other arrangements which embody the principles of the invention and which fall within its spirit and scope may be readily devised by those skilled in the art. Accordingly, the invention is not limited by the foregoing description, but is only limited by the scope of the appended claims.

What is claimed is:

1. A hydraulic damping device adapted to be interposed between and connect an oscillating mass, which oscillates in a direction oriented along an axis of said damping device, and a structure fixed relative to said oscillating mass, said damping device comprising:
   a rigid container having a lateral wall and a base;
   a first elastomeric member disposed to form a lid for said rigid container;
   a second elastomeric member connected in a fluid-tight manner to said lateral wall of said container;

an elastomeric diaphragm adapted to have its central plane oriented substantially perpendicular to said direction of said oscillations, said diaphragm being disposed within the space inside said container to divide said container into two chambers, a first chamber disposed between said diaphragm and said first member and a second chamber disposed between said diaphragm and said second member so that said second member forms the base of said second chamber, said diaphragm comprising a first part having two opposite parallel surfaces substantially parallel to said central plane, a second annular radially outermost part forming a wall substantially perpendicular to said central plane and oriented axially of said damping device, and two annular hinge zones between said first part and second part;

a pair of stop-limit means comprising stop-limit elements respectively disposed at a distance from said two opposite parallel surfaces of said diaphragm, for limiting movement of said diaphragm in a direction along said axis of said damping device;

a low viscosity liquid disposed within said first chamber and said second chamber;

an annular circuit having a circular arc configuration and having two extremities hydraulically connected respectively to said first chamber and said second chamber, for damping low frequency and high amplitude oscillations of said oscillating mass, said annular conduit comprising (i) two adjacent rigid half portions oriented substantially symmetrically relative to said central plane, said two half portions forming an outermost side of said annular conduit, and (ii) two opposite bases substantially parallel to said central plane, said two opposite bases having two rigid prolongation portions having cut away center portions;

said annular portion of said diaphragm contacting said two rigid prolongation portions to form a radially innermost portion of said conduit;

said two extremities of the annular conduit being formed respectively on said two adjacent rigid half portions and comprising respective apertures at respective ones of said two opposite based to connect said two extremities hydraulically to said first chamber and said second chamber respectively.

2. The device as in claim 1, wherein said two half portions each have a substantially rectangular cross-section including (i) said outermost side of said annular conduit, (ii) said two opposite bases, and (iii) said two prolongation portions, and (iv) said radially outermost portion of said diaphragm, said radially outermost portion of said diaphragm contacting said two prolongation portions of said two opposite bases, and wherein said two opposite bases include respective inclined planar portions directed inwardly into said conduit and contacting at their tip ends the other one of said two opposite bases, said apertures of said two opposite bases forming respectively an entrance and an exit of said conduit to allow passage of said liquid between said first chamber and said second chamber, a space between said respective inclined planar portions being devoid of liquid and filled with a portion of elastomeric material of said diaphragm.

3. The device as in claim 2, wherein two annular hinge zones are formed by two annular slits having a U-shaped cross section in a plane oriented parallel to said axial axis of said damping device.

4. The device as in claim 1, wherein said diaphragm comprises a blocking means for said conduit.

5. The device as in claim 4, wherein said blocking means comprises two opposing protuberances disposed on a peripheral portion of said diaphragm and corresponding seats formed in said two opposite bases of said conduit for housing said protuberances.

6. The device as in claim 1, wherein said two rigid half portions of said conduit are in close contact with each other along two outer annular flanges, said flanges being fixed to said lateral wall of said container.

7. The device as in claim 6, wherein said two flanges are positioned between an annular heel of said second member and an annular edge of said first member, said heel being applied against one of said flanges by a ridge surface of said container.

8. The device as in claim 1, wherein said stoplimit elements are connected to said conduit.

9. The device as in claim 8, wherein said stop-limit elements comprise radially extending spokes and an inner annular crown portion, said spokes interconnecting said conduit and said crown portion.

* * * * *